United States Patent

Hold et al.

(10) Patent No.: US 9,138,839 B2
(45) Date of Patent: Sep. 22, 2015

(54) PISTON HAVING POSITION RINGS AND SUPPORT RINGS

(75) Inventors: Christian Hold, Bisamberg (AT); Martin Lagler, Vienna (AT); Alexander Jandl, Rohrendorf bei Krems (AT)

(73) Assignee: Hoerbiger Kompressortechnik Holding GmbH, Vienna (AU)

( * ) Notice: Subject to any disclaimer, the term of this patent is extended or adjusted under 35 U.S.C. 154(b) by 682 days.

(21) Appl. No.: 13/513,031

(22) PCT Filed: Oct. 28, 2010

(86) PCT No.: PCT/EP2010/066378
§ 371 (c)(1),
(2), (4) Date: Aug. 14, 2012

(87) PCT Pub. No.: WO2011/072941
PCT Pub. Date: Jun. 23, 2011

(65) Prior Publication Data
US 2012/0304854 A1 Dec. 6, 2012

(30) Foreign Application Priority Data
Dec. 14, 2009 (AT) .................. A 1970/2009

(51) Int. Cl.
| F16J 1/00 | (2006.01) |
| B23P 15/06 | (2006.01) |
| F16J 9/20 | (2006.01) |
| F16J 15/16 | (2006.01) |
| F16J 15/44 | (2006.01) |
| F16J 15/56 | (2006.01) |

(52) U.S. Cl.
CPC .. B23P 15/06 (2013.01); F16J 9/20 (2013.01); F16J 15/166 (2013.01); F16J 15/441 (2013.01); F16J 15/56 (2013.01); Y10T 29/49249 (2015.01)

(58) Field of Classification Search
CPC ................. F16J 9/22; F16J 9/26; B23P 15/08
USPC ......................................... 92/128
See application file for complete search history.

(56) References Cited

U.S. PATENT DOCUMENTS

| 4,556,223 A | 12/1985 | VanLoon et al. |
| 5,347,915 A | 9/1994 | Feistel |

FOREIGN PATENT DOCUMENTS

| JP | 2003003960 | 1/2003 |
| WO | 2010084071 | 7/2010 |

OTHER PUBLICATIONS

English Abstract of JP 2003003960.

*Primary Examiner* — Edward Look
*Assistant Examiner* — Daniel Collins
(74) *Attorney, Agent, or Firm* — Dykema Gossett PLLC

(57) ABSTRACT

A support ring (12) and a piston ring (11) that are arranged in a peripheral groove (20) provided on a piston body (15), the axial width of the peripheral groove (20) being greater than the total axial width of the support ring (12) and of the piston ring (11), and the support ring (12) is arranged radially inwardly at a distance from the piston body (15), and the support ring (12) is relief-milled from the piston body (15) as an unbroken ring.

8 Claims, 3 Drawing Sheets

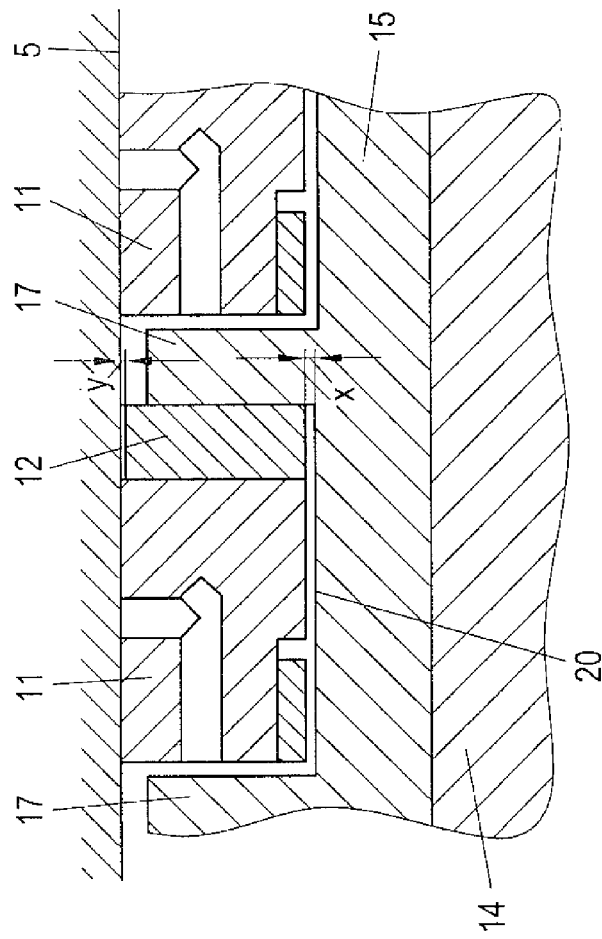
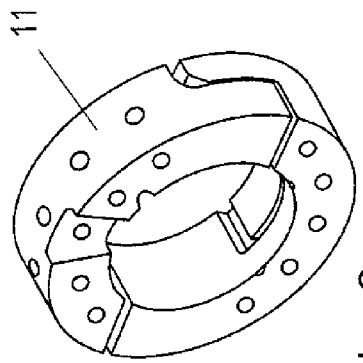
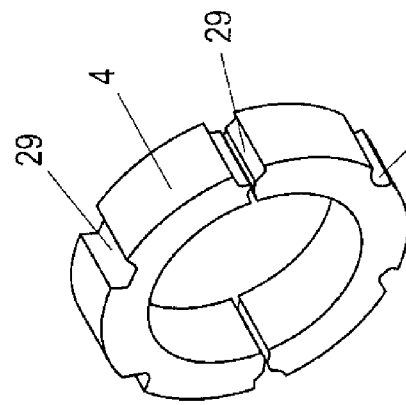
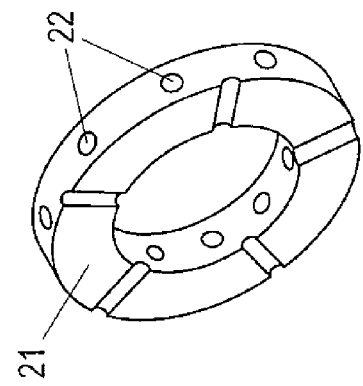

PISTON HAVING POSITION RINGS AND SUPPORT RINGS

The present invention relates to a piston having a piston body and a number of piston rings and support rings, wherein a piston ring and a support ring are arranged in a peripheral groove provided on the piston body, and the piston ring is supported on the support ring; and a method for manufacturing such a piston body and piston.

In a conventional constructed piston 1 (as shown in FIG. 1), for example for a reciprocating piston compressor, the piston rings 2 are accommodated in a rigid L-shaped disk 3, the piston rings 2 being supported on the radial legs of the L-shaped disks 3. In the present case, the L-shaped disks 3 are arranged directly on a piston rod 6 and fixed in place. The piston 1 is guided through a bearing ring 4 in the cylinder 5, thus preventing the piston 1 from running against the cylinder 5. With increasing wear on the bearing ring, however, the mobility of the piston 1 transverse to the stroke motion (indicated by a double arrow) increases. For such a piston 1 it is therefore necessary for the play between the piston 1 (i.e., the L-shaped disks 3) and the cylinder 5 to be as great as possible to be able to achieve maximum wear on the bearing ring. However, this requirement necessarily results in a large amount of play between the piston 1 and the cylinder 5, but as a consequence the piston rings 2, which are generally made of a plastic such as PTFE, may extrude into this gap between the L-shaped disks 3 and the cylinder 5. This play should therefore be as small as possible so that the piston rings 2 do not extrude into the gap, in particular at high pressures. To meet these conflicting requirements using such a known piston 1, an additional backup ring may be arranged in the piston ring groove; however, this increases the length of the piston.

The piston according to EP 541 482 A1 solves this problem using adjustable slotted piston rings. To this end, the piston rings are arranged in an L-shaped chamber ring and are arranged radially inwardly at a distance from the delimiting surface of the chamber ring, the piston rings being clamped by adjacent chamber rings. The working pressure is led into the resulting annular space, causing the piston rings to be pushed against the bearing surface of the cylinder. An end face of the piston ring, the same as the radial leg of the L-shaped chamber ring, is beveled, the two parallel angled surfaces being spaced apart from one another in the starting position. With increasing wear on the piston rings, the two angled surfaces increasingly approach one another until they make contact, thus reaching the wear limit. Axial mobility of the piston is prevented due to the piston being guided through the piston rings in the cylinder. However, the play between the piston and the cylinder, and therefore the risk of extrusion, may be reduced due to the fact that the adjustable piston rings prevent the piston from running against the cylinder. However, such a piston is complicated to manufacture due to the angled surfaces and the necessary leading of the gas pressure into the annular space. In addition, the necessary axial clamping of the piston rings by adjacent chamber rings results in a double fitting problem, which likewise causes manufacturing difficulties. A further consequence is that the piston rings may be pushed against the cylinder with different pressure forces, which in turn may result in undesired differences in the wear rates on the piston rings.

A constructed piston has the additional problem that the piston is composed of a very large number of individual parts, thus complicating the production and assembly of such a piston.

The object of the present invention, therefore, is to provide a piston and piston body, and a method for manufacturing same, which meets the two conflicting requirements of a large amount of play between the piston and the cylinder on the one hand, and a low degree of extrusion of the piston ring on the other hand, and has a simple and compact design and functions with few individual parts.

According to the invention, this object is achieved for the piston in that the axial width of the peripheral groove is greater than the total axial width of the support ring and of the piston ring, the support ring is arranged radially inwardly at a distance from the piston body, and the support ring is an unbroken ring which is relief-milled from the piston body. The method according to the invention is characterized in that the piston body is manufactured with a peripheral groove-shaped indentation, the peripheral groove-shaped indentation is subsequently relief-milled to the desired width of the peripheral groove, and the relief-milled portion of the peripheral groove-shaped indentation is separated to form the support ring. Thus, using the system according to the invention, on the one hand a support ring does not move with the piston when the piston moves transverse to the stroke motion, but, rather, only the piston body moves relative to the support ring. A support ring is therefore not pushed against the contact surface of the cylinder due to the piston motion, so that the radial play between the support ring and the contact surface may be significantly reduced. On the other hand, as a result of the support ring being relief-milled from the piston body, the number of individual parts required is drastically reduced, since the piston body together with the support rings may be manufactured as one part. Therefore, only piston rings and optionally further rings are additionally necessary for completing the piston. After the piston body together with the support ring is manufactured, advantageously only one piston ring is additionally inserted into the peripheral groove in order to complete the piston. The piston and piston body manufactured in this manner may then be mounted on a piston middle part in a manner that is well known, and may optionally be fastened thereto with a piston end part.

The present invention is described below with reference to schematic FIGS. 1 through 7, which by way of example illustrate advantageous embodiments in a non-limiting manner.

FIG. 3 shows a detail of a piston according to the invention,

FIGS. 4 through 6 show embodiments of the rings used in the piston, and

Figure 1:
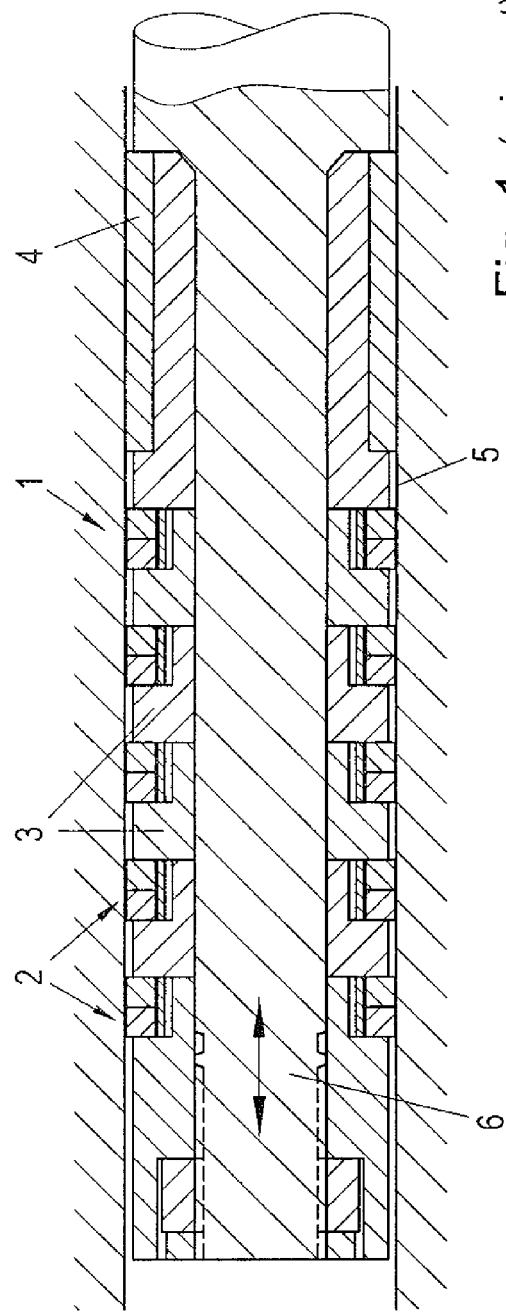
FIG. 1 shows a piston according to the prior art.
Figure 2:
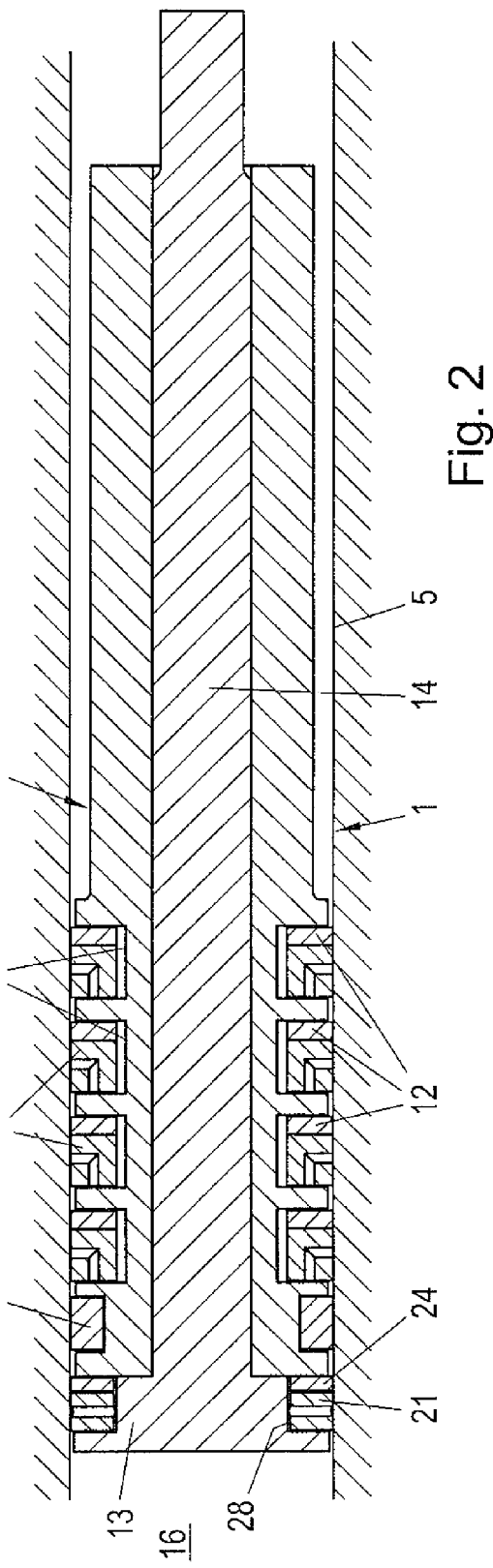
FIG. 2 shows a piston according to the invention.

One advantageous embodiment of a piston according to the invention is described below with reference to FIGS. 2 and 3. The piston 1 is composed of a one-part piston body 15, in the present case in the form of a hollow cylindrical body. In this example, the piston body 15 is arranged on a piston middle part 14, which in the exemplary embodiment shown is at the same time a piston end part 13. However, it is also of course conceivable, as is known, for the piston end part 13 to be designed as a separate part which, for example, is screwed onto the piston middle part 14. Depending on the design of the machine in which the piston 1 is used, one axial end of the piston 1 may be connected to either a connecting rod or a piston rod, as is well known. In the case of a piston rod, the piston 1 does not have to be fixedly connected to the piston rod (via a simple thread, for example), but instead may only rest loosely against the piston rod, since the pressure acting in the compression chamber 16 ensures that the piston 1 remains in contact with the piston rod and is thus moved together with same. However, it would also be possible to produce the piston middle part 14 from the piston rod, and to use a piston end part 13 to fasten the piston body 15 to the piston rod, which then at the same is the piston middle part 14.

A number of piston rings 11 are arranged on the piston body 15. In principle, the piston rings 11 may have any desired design. It is preferred to use adjusting piston rings 11 which are consistently pushed radially outwardly against the cylinder 5 upon progressive wear due to the acting pressure, for example. One possible design of such piston rings 11 may be found in AT 505 549 B, for example.

A peripheral groove 20 in which a piston ring 11 and a support ring 12 are arranged is provided on the piston body 15. The width of the peripheral groove 20 is slightly greater than the overall width composed of the width of the support ring 12 and the width of the piston ring 11, so that the support ring 12 and the piston ring 11 are arranged in the peripheral groove 20 with axial play and are not axially clamped, and in particular the piston body 15 maintains unhindered mobility relative to the support ring 12. Only frictional forces between the support ring 12 and the peripheral groove 20 due to the pressures that are present act against the free relative mobility of the piston body 15. Thus, when the piston 1 moves transverse to the stroke direction, only the piston body 15 moves, and the support rings 12 are not moved together with same. Therefore, in the worst case the support rings 12 lie with their own very low weight force against the cylinder wall. However, no forces are transmitted from the piston body 15 to the support rings 12. The support ring 12 is supported on the piston body 15 on a peripheral web 17 which results between two adjacent peripheral grooves 20, or the last support ring 12 is supported on the piston body 15 itself.

The support ring 12 is designed as a solid unbroken ring. To obtain the support ring in the peripheral groove 20 of the one-part piston body 15, during manufacture of the piston body 15 the support ring 12 is relief-milled from the piston body, as described in greater detail below.

When the piston 1 moves transverse to the stroke motion, as a result of the radial play X between the support ring 12 and the base of the peripheral groove 20 the piston body 15 is able to move in the radial direction relative to the support ring 12 without the support ring 12 being moved as well. A support ring 12 may therefore be inserted between the cylinder 5 and the outer peripheral surface of the support ring 12 with very little play Y, since there is no risk of the support ring 12 being pushed against the cylinder 5 with increased force due to such a transverse motion. By means of the system according to the invention, the play Y may be easily reduced to 0.1 mm. The thermal expansion of the support ring 12 represents a natural limit of the play Y, which of course should not result in the support ring 12 being radially clamped in the cylinder 5. However, due to the possible low play Y, extrusion of the piston ring 11 into the gap between the support ring 12 and the cylinder 5 may also be practically eliminated. The piston rings 11 may likewise be radially arranged at a distance from the piston body 15, for example when piston rings according to AT 505 549 B are used, so that radial play likewise results between the piston rings 11 and the piston body 15, and becomes greater with increasing wear on the piston ring. The acting pressure which pushes the piston ring 11 outwardly against the cylinder 5 is present in the resulting annular space. Therefore, any transverse motion of the piston body 15 does not influence the piston rings 11.

In one advantageous embodiment of a piston 1 according to the invention, an unbroken ring 21 is arranged at the end of the piston 1 facing the compression chamber 16 in order to close off the dynamic pressure component of the working pressure. The unbroken ring 21 may also lie against a support ring 24. For this purpose, the unbroken ring 21 may be arranged in a peripheral groove 28 of the piston middle part 14 or of the piston end part 13, and in turn is radially arranged at a distance from the base of the associated peripheral groove 28. The width of the peripheral groove 28 is greater than the width of the unbroken ring 21 in order to allow unhindered transverse motion of the piston body 15. The unbroken ring 21 lies axially against a support ring 24, which is likewise in the peripheral groove 28 and is radially arranged at a distance from the base of the peripheral groove 28. The support ring 24 and the unbroken ring 21 are in turn inserted into the peripheral groove 28 with axial play so that they do not become axially clamped.

A bearing ring 4 is also arranged on the piston body 15. However, this bearing ring and/or a further bearing ring 4 may also be arranged at the piston middle part 14 or the piston end part 13, or on the piston body 15 on the crankcase side.

Possible designs of rings that are used are illustrated in FIGS. 4 through 6. Pressure compensation holes 22 may be provided in the unbroken ring 21 (FIG. 4). The unbroken ring 21 may advantageously be made of PTFE, since PTFE rings are able to adjust to a certain amount of wear. A bearing ring 4 shown in FIG. 5 may have a notched design, and may have continuous axial grooves 29 at the radially outward peripheral surface in order to lead the acting pressure to the piston rings 11 to prevent a pressure difference from developing at the bearing ring 4. The design of a piston ring 11 illustrated in FIG. 6 corresponds to the description in AT 505 549 B. However, any other design of a piston ring 11 is also conceivable.

Figure 7:
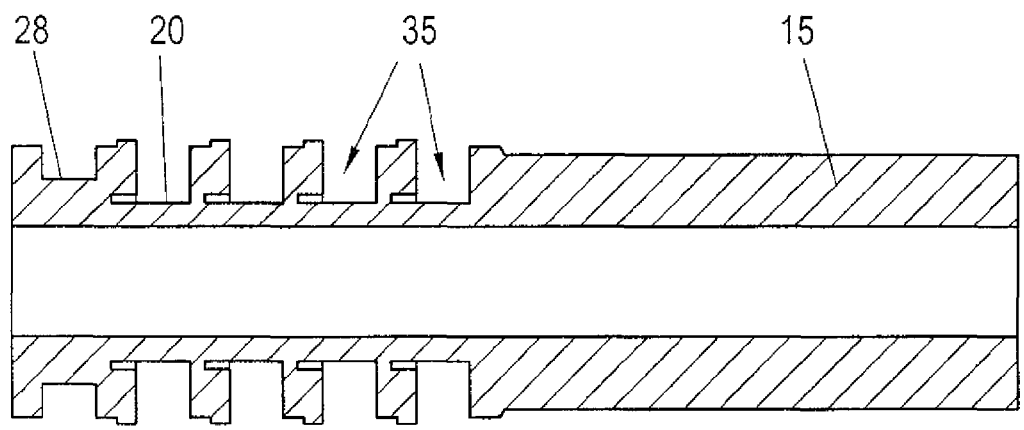
FIGS. 7 and 8 show a schematic illustration of the manufacture of a piston body of a piston according to the invention.
Figure 8:
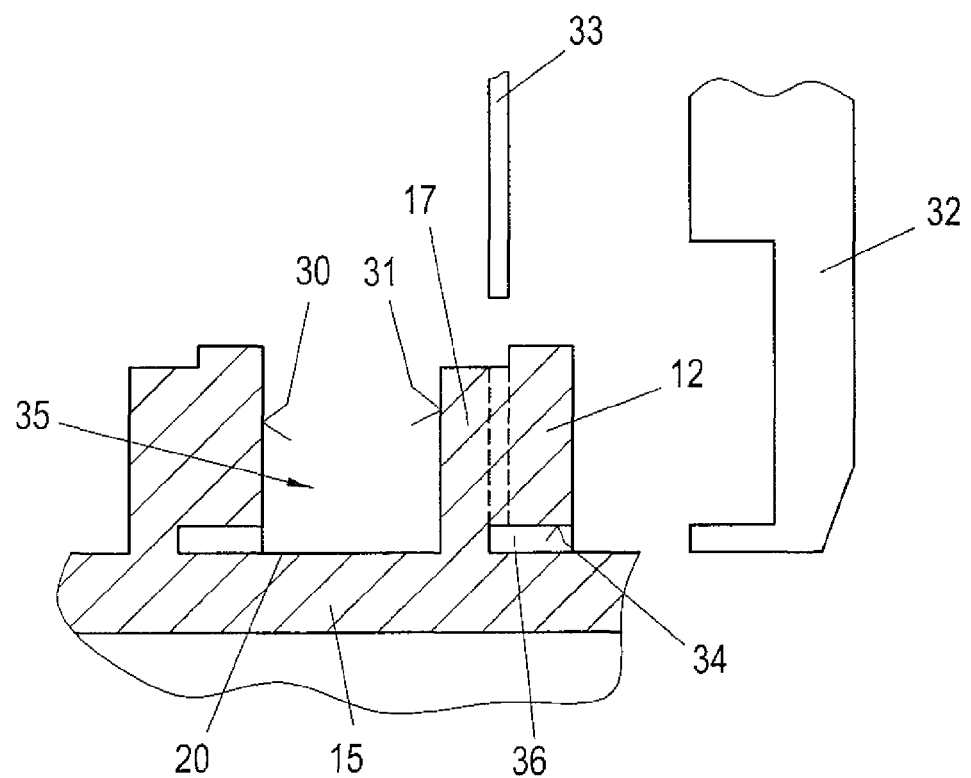

In the manufacture of the piston 1 according to the invention, the piston body 15 is preferably provided with all steps and peripheral groove-shaped indentations 35 for subsequently accommodating the piston rings 11 and support rings 12 (at least one piston ring 11 and one support ring 12), and possibly the middle borehole for subsequently accommodating the piston middle part 14, by relief milling from a semi-finished product (FIG. 7). The outer diameters of the individual piston parts may be produced in this step. Any additional peripheral grooves or steps, for example for accommodating bearing rings or other rings, may be produced at the same time. After these initial work steps, however, the subsequent support ring 12 is still connected to the peripheral web 17 between two adjacent peripheral grooves 20. One axial end of the peripheral groove-shaped indentation 35 (the region to subsequently become the support ring 12) is relief-milled to the desired final width of the peripheral groove 20, using a suitable tool such as a boring tool 32 or a similar tool. The relief milling 36 is performed at the same radius as the base of the peripheral groove 20. The subsequent support ring 12 is thus provided here with its spacing between the base of the peripheral groove 20 and the inner peripheral surface 34 of the support ring 12. It is possible to produce the two mutually facing axial end faces 30, 31 of the peripheral groove-shaped indentation 35, on which the support ring 12 axially lies against the piston body 15 in the finished piston, for forming sealing surfaces having the necessary tolerances, such as surface quality (Ra 0.8, for example) and parallelism. This is particularly advantageous due to the fact that the support ring 12 and the piston body 15 are made of metal, and precisely fabricated end faces 30, 31 are necessary for a good sealing effect. To form the support ring 12, the relief-milled portion of the peripheral groove-shaped indentation 35 is separated from the piston body 15 using a suitable tool such as a cutting disk. The support ring formed in this manner is thus able to move freely in the peripheral groove 20. However, it is of course also conceivable to produce one peripheral groove 20 with a support ring 12 after the other, the work steps used remaining the same.

In the above-described manner it is possible to produce the piston body 15 and support rings 12 from a single part, thus drastically reducing the number of individual parts. To complete the piston 1, it is then necessary only to insert the piston rings 11 into the peripheral grooves 20, and to insert possible bearing rings 4 into the associated peripheral grooves. For this purpose, the support rings 12 are to be axially displaced beforehand in such a way that the two end faces 30, 31 are axially abutting one another. The piston body 15 is subsequently mounted on the piston middle part 14 and optionally fastened thereto, for example by means of the piston end part 13.

The invention claimed is:

1. A piston having a piston body and a number of piston rings and support rings which are arranged axially one behind the other on the piston body, wherein a piston ring and a support ring are arranged in a peripheral groove provided on the piston body, and the piston ring is supported on the support ring, wherein the axial width of the peripheral groove is greater than the total axial width of the support ring and of the piston ring, and the support ring defines a radially inwardly facing surface spaced a distance from a floor of the peripheral groove in which the support ring is located, and the support ring is an unbroken ring which is relief-milled from the piston body.

2. The piston according to claim 1, including at least one bearing ring on the piston body.

3. The piston according to claim 1, wherein the piston body is arranged on a piston middle part.

4. The piston according to claim 3, including a piston end part at one axial end of the piston for fixing the piston body to the piston middle part.

5. A method for manufacturing a piston body for a piston having at least one support ring which is arranged in a peripheral groove provided on the piston body, comprising the following method steps:
   a) producing the piston body with a peripheral groove-shaped indentation,
   b) relief milling the peripheral groove-shaped indentation to the desired width of the peripheral groove, and
   c) separating the relief-milled part of the peripheral groove-shaped indentation to form the support ring.

6. The method according to claim 5, wherein before the relief-milled part of the peripheral groove-shaped indentation is separated, the two mutually facing end faces of the peripheral groove-shaped indentation are produced for forming sealing surfaces having the necessary tolerances.

7. The method for manufacturing a piston having at least one piston ring and one support ring which are arranged in a peripheral groove provided on the piston body, comprising the following method steps:
   a) producing the piston body with a peripheral groove-shaped indentation,
   b) relief milling the peripheral groove-shaped indentation to the desired width of the peripheral groove,
   c) separating the relief-milled part of the peripheral groove-shaped indentation to form the support ring, and
   d) inserting the piston ring into the peripheral groove.

8. The method according to claim 7, wherein before the relief-milled part of the peripheral groove-shaped indentation is separated, the two mutually facing end faces of the peripheral groove-shaped indentation are produced for forming sealing surfaces having the necessary tolerances.

* * * * *

UNITED STATES PATENT AND TRADEMARK OFFICE
CERTIFICATE OF CORRECTION

| | | |
|---|---|---|
| PATENT NO. | : 9,138,839 B2 | Page 1 of 1 |
| APPLICATION NO. | : 13/513031 | |
| DATED | : September 22, 2015 | |
| INVENTOR(S) | : Hold et al. | |

It is certified that error appears in the above-identified patent and that said Letters Patent is hereby corrected as shown below:

Title Page,

(73) Assignee should read: Hoerbiger Kompressortechnik Holding GmbH, Vienna (AT)

Signed and Sealed this
Ninth Day of February, 2016

Michelle K. Lee
*Director of the United States Patent and Trademark Office*